(12) United States Patent
Karabinis (10) Patent No.: US 7,756,490 B2
(45) Date of Patent: Jul. 13, 2010

(54) METHODS, RADIOTERMINALS, AND ANCILLARY TERRESTRIAL COMPONENTS FOR COMMUNICATING USING SPECTRUM ALLOCATED TO ANOTHER SATELLITE OPERATOR

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 1184 days.

(21) Appl. No.: 11/355,639

(22) Filed: Feb. 16, 2006

(65) Prior Publication Data

US 2006/0205367 A1 Sep. 14, 2006

Related U.S. Application Data

(60) Provisional application No. 60/659,463, filed on Mar. 8, 2005.

(51) Int. Cl.
*H04B 1/34* (2006.01)

(52) U.S. Cl. .................. 455/95; 342/352; 370/316; 455/12.1

(58) Field of Classification Search ............ 455/95
See application file for complete search history.

(56) References Cited

U.S. PATENT DOCUMENTS

| | | | |
|---|---|---|---|
| 4,119,964 A * | 10/1978 | Fletcher et al. | ............ 342/173 |
| 4,901,307 A | 2/1990 | Gilhousen et al. | |
| 5,073,900 A | 12/1991 | Mallinckrodt | |
| 5,303,286 A | 4/1994 | Wiedeman | |
| 5,327,572 A * | 7/1994 | Freeburg | .................... 455/430 |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |
| 5,612,703 A | 3/1997 | Mallinckrodt | |

(Continued)

FOREIGN PATENT DOCUMENTS

EP 0 506 255 A2 9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner*—Duc Nguyen
*Assistant Examiner*—Hai V Nguyen
(74) *Attorney, Agent, or Firm*—Myers Bigel Sibley & Sajovec, P.A.

(57) ABSTRACT

A method of providing communications can be provided by at least one space-based and/or terrestrial component of a first system/operator transmitting/receiving information using spectrum allocated to a second system/operator at an aggregate interference level at a space-based component of the second system/operator that is less than or substantially equal to a predetermined threshold. Related other methods, systems, and radioterminals are also disclosed.

11 Claims, 3 Drawing Sheets

U.S. PATENT DOCUMENTS

| | | | |
|---|---|---|---|
| 5,619,525 A | 4/1997 | Wiedeman et al. | |
| 5,631,898 A | 5/1997 | Dent | |
| 5,761,605 A | 6/1998 | Tawil et al. | |
| 5,765,098 A | 6/1998 | Bella | |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,862,479 A | 1/1999 | Cutler, Jr. et al. | |
| 5,875,180 A * | 2/1999 | Wiedeman et al. | 370/320 |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,279 A * | 11/1999 | Haugli et al. | 370/311 |
| 5,991,345 A | 11/1999 | Ramasastry | |
| 5,995,832 A | 11/1999 | Mallinckrodt | |
| 6,011,951 A | 1/2000 | King et al. | |
| 6,023,463 A * | 2/2000 | Wiedeman et al. | 370/344 |
| 6,023,605 A | 2/2000 | Sasaki et al. | |
| 6,052,560 A | 4/2000 | Karabinis | |
| 6,052,586 A * | 4/2000 | Karabinis | 455/427 |
| 6,067,442 A | 5/2000 | Wiedeman et al. | |
| 6,072,430 A | 6/2000 | Wyrwas et al. | |
| 6,072,768 A * | 6/2000 | Wiedeman et al. | 455/428 |
| 6,078,815 A * | 6/2000 | Edwards | 455/450 |
| 6,085,094 A | 7/2000 | Vasudevan et al. | |
| 6,088,572 A | 7/2000 | Vatt et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,236,834 B1 * | 5/2001 | Poskett et al. | 455/13.1 |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,272,325 B1 * | 8/2001 | Wiedeman et al. | 455/117 |
| 6,324,405 B1 | 11/2001 | Young et al. | |
| 6,339,707 B1 | 1/2002 | Wainfan et al. | |
| 6,373,823 B1 * | 4/2002 | Chen et al. | 370/252 |
| 6,418,147 B1 | 7/2002 | Wiedeman | |
| 6,449,461 B1 | 9/2002 | Otten | |
| 6,522,865 B1 | 2/2003 | Otten | |
| 6,628,919 B1 | 9/2003 | Curello et al. | |
| 6,684,057 B2 | 1/2004 | Karabinis | |
| 6,735,437 B2 | 5/2004 | Mayfield et al. | |
| 6,744,743 B2 * | 6/2004 | Walton et al. | 370/318 |
| 6,775,251 B1 | 8/2004 | Wiedeman et al. | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,950,625 B2 * | 9/2005 | Regulinski et al. | 455/13.1 |
| 6,975,837 B1 | 12/2005 | Santoru | |
| 7,054,593 B2 * | 5/2006 | de La Chapelle et al. | 455/13.4 |
| 7,103,317 B2 * | 9/2006 | Chang et al. | 455/66.1 |
| 7,136,620 B2 * | 11/2006 | Wang | 455/13.1 |
| 7,136,621 B2 * | 11/2006 | de La Chapelle et al. | 455/13.2 |
| 7,155,161 B2 * | 12/2006 | Regulinski et al. | 455/13.1 |
| 7,168,084 B1 * | 1/2007 | Hendricks et al. | 725/42 |
| 7,308,229 B2 * | 12/2007 | Hane et al. | 455/3.02 |
| 2002/0058477 A1 * | 5/2002 | Chapelle | 455/13.4 |
| 2002/0058478 A1 * | 5/2002 | de La Chapelle et al. | 455/13.4 |
| 2002/0122408 A1 | 9/2002 | Mullins | |
| 2002/0144272 A1 * | 10/2002 | McLain et al. | 725/76 |
| 2002/0146979 A1 * | 10/2002 | Regulinski et al. | 455/13.1 |
| 2002/0160708 A1 * | 10/2002 | Hane et al. | 455/3.06 |
| 2002/0177465 A1 | 11/2002 | Robinett | |
| 2003/0003815 A1 | 1/2003 | Yamada | |
| 2003/0022625 A1 | 1/2003 | Otten et al. | |
| 2003/0054761 A1 | 3/2003 | Karabinis | |
| 2003/0054762 A1 | 3/2003 | Karabinis | |
| 2003/0054814 A1 | 3/2003 | Karabinis et al. | |
| 2003/0054815 A1 | 3/2003 | Karabinis | |
| 2003/0068978 A1 | 4/2003 | Karabinis et al. | |
| 2003/0073436 A1 | 4/2003 | Karabinis et al. | |
| 2003/0149986 A1 | 8/2003 | Mayfield et al. | |
| 2003/0153308 A1 | 8/2003 | Karabinis | |
| 2003/0185164 A1 * | 10/2003 | Marko et al. | 370/316 |
| 2004/0018837 A1 * | 1/2004 | Mayfield et al. | 455/422.1 |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0142660 A1 | 7/2004 | Churan | |
| 2004/0192200 A1 | 9/2004 | Karabinis | |
| 2004/0192293 A1 | 9/2004 | Karabinis | |
| 2004/0192395 A1 | 9/2004 | Karabinis | |
| 2004/0198312 A1 * | 10/2004 | Jarett | 455/404.1 |
| 2004/0203393 A1 * | 10/2004 | Chen | 455/63.1 |
| 2004/0203742 A1 | 10/2004 | Karabinis | |
| 2004/0240525 A1 | 12/2004 | Karabinis et al. | |
| 2005/0020299 A1 * | 1/2005 | Malone et al. | 455/552.1 |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0064813 A1 | 3/2005 | Karabinis | |
| 2005/0079816 A1 | 4/2005 | Karabinis et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0170834 A1 * | 8/2005 | Dutta et al. | 455/436 |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 | 10/2005 | Karabinis et al. | |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0260947 A1 | 11/2005 | Karabinis et al. | |
| 2005/0260948 A1 * | 11/2005 | Regulinski et al. | 455/12.1 |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0277382 A1 * | 12/2005 | Walker | 455/3.02 |
| 2005/0282542 A1 | 12/2005 | Karabinis | |
| 2005/0288011 A1 | 12/2005 | Dutta | |
| 2006/0040614 A1 * | 2/2006 | Chapelle et al. | 455/13.4 |
| 2007/0026795 A1 * | 2/2007 | de La Chapelle | 455/13.4 |
| 2007/0054614 A1 * | 3/2007 | Walker et al. | 455/3.02 |
| 2007/0077884 A1 * | 4/2007 | Regulinski et al. | 455/12.1 |
| 2008/0148321 A1 * | 6/2008 | Hane et al. | 725/71 |

FOREIGN PATENT DOCUMENTS

| | | |
|---|---|---|
| EP | 0 597 225 A1 | 5/1994 |

| | | |
|---|---|---|
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 0 858 177 A2 | 8/1998 |
| EP | 1 059 826 A1 | 12/2000 |
| EP | 1 193 989 A1 | 4/2002 |
| WO | WO 01/54314 A1 | 7/2001 |

OTHER PUBLICATIONS

Ayyagari et al., "A satellite-augmented cellular network concept" *Wireless Networks*, Vo. 4, 1998, pp. 189-198.

International Search Report for PCT/US/2006/006901; date of mailing Jun. 19, 2006.

* cited by examiner

METHODS, RADIOTERMINALS, AND ANCILLARY TERRESTRIAL COMPONENTS FOR COMMUNICATING USING SPECTRUM ALLOCATED TO ANOTHER SATELLITE OPERATOR

CLAIM FOR PRIORITY

This application claims priority to U.S. Provisional Patent Application No. 60/659,463, filed Mar. 8, 2005, entitled Reusing Spectrum of Another Satellite Operator for MSS and ATC Without Exceeding a Coordination Threshold, the entirety of which is incorporated herein by reference.

FIELD OF THE INVENTION

This invention relates to wireless communications systems and methods, and more particularly to satellite and terrestrial communications systems and methods.

BACKGROUND

Satellite communications systems and methods are widely used for wireless communications. Satellite communications systems and methods generally employ at least one space-based component, such as one or more satellites, that is configured to wirelessly communicate with a plurality of satellite radioterminals.

A satellite radioterminal communications system or method may utilize a single antenna pattern (beam or cell) covering an entire area served by the system. Alternatively or in combination with the above, in cellular satellite radioterminal communications systems and methods, multiple antenna patterns (beams or cells) are provided, each of which can serve substantially distinct geographical areas in the overall service region, to collectively serve an overall satellite footprint. Thus, a cellular architecture similar to that used in conventional terrestrial cellular/PCS radioterminal systems and methods can be implemented in cellular satellite-based systems and methods. The satellite typically communicates with radioterminals over a bidirectional communications pathway, with radioterminal communications signals being communicated from the satellite to the radioterminal over a downlink or forward link, and from the radioterminal to the satellite over an uplink or return link.

The overall design and operation of cellular satellite radioterminal systems and methods is well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A radioterminal also may be referred to herein as a "radiotelephone," "terminal", or "wireless user device". As used herein, the term "space-based" component includes one or more satellites and/or one or more other objects/platforms (e.g., airplanes, balloons, unmanned vehicles, space crafts, missiles, etc.) that have a trajectory above the earth at any altitude. Furthermore, as used herein, the term "transmitting/receiving data" shall have the same meaning and may be used interchangeably with the term "transmitting/receiving information."

A terrestrial network can enhance an availability, efficiency and/or economic viability of a cellular satellite radioterminal system by terrestrially using/reusing at least some of the frequencies that are authorized for use and/or are used by the cellular satellite radioterminal system. In particular, it is known that it may be difficult for cellular satellite radioterminal systems to reliably serve densely populated areas, because satellite signals may be, for example, blocked by high-rise structures and/or may not penetrate into buildings. As a result, satellite spectrum may be underutilized or unutilized in such areas. Terrestrial use/reuse of at least some of the satellite system frequencies can reduce or eliminate this potential problem.

A capacity of a hybrid system, comprising terrestrial and satellite-based communications, configured to terrestrially use/reuse at least some of the satellite-band frequencies, may be higher than a corresponding satellite-only system since terrestrial frequency reuse may be much denser than that of the satellite-only system. In fact, capacity may be enhanced where it may be mostly needed, i.e., in densely populated urban/industrial/commercial areas where the signal(s) of a satellite-only system may be unreliable. As a result, a hybrid (satellite/terrestrial cellular) system that is configured to use/reuse terrestrially at least some of the frequencies of the satellite band may become more economically viable, as it may be able to serve more effectively and reliably a larger subscriber base.

One example of terrestrial reuse of satellite band frequencies is described in U.S. Pat. No. 5,937,332 to the present inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal(s) from satellite(s)/radioterminal(s) thereby increasing an effective downlink/uplink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radioterminals for a satellite radioterminal system or method having a terrestrial communications capability by terrestrially using/reusing at least some of the satellite frequency band and using substantially the same air interface for both terrestrial and satellite communications may be more cost effective and/or aesthetically appealing than other alternatives. Conventional dual band/dual mode radioterminal alternatives, such as the well known Thuraya, Iridium and/or Globalstar dual mode satellite/terrestrial radioterminals, duplicate some components (as a result of the different frequency bands and/or air interface protocols that are used for satellite and terrestrial communications), which can lead to increased cost, size and/or weight of the radioterminal. See U.S. Pat. No. 6,052,560 to the present inventor Karabinis, entitled Satellite System Utilizing a Plurality of Air Interface Standards and Method Employing Same.

U.S. Pat. No. 6,684,057, to present inventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite frequency can be reused terrestrially by an ancillary terrestrial network even within the same satellite cell, using interference cancellation techniques. In particular, a system according to some embodiments of U.S. Pat. No. 6,684,057 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

Satellite radioterminal communications systems and methods that may employ terrestrial use/reuse of satellite frequencies by an Ancillary Terrestrial Network (ATN) comprising at least one Ancillary Terrestrial Component (ATC) are also described in Published U.S. Patent Application Nos. US 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; U.S. Pat. No. 6,785,543 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Some satellite radioterminal communications systems and methods may employ satellites that use multiple bands for communications with radioterminals. For example, U.S. patent application Publication Ser. No. US 2003/0054762 to Karabinis, cited above, describes satellite radioterminal systems and communications methods that include a space-based component that is configured to communicate with radioterminals in a satellite footprint that is divided into satellite cells. The space-based component is configured to communicate with a first radioterminal in a first satellite cell over a first frequency band and/or a first air interface, and to communicate with a second radioterminal in the first or a second satellite cell over a second frequency band and/or a second air interface. An ancillary terrestrial network also is provided that is configured to communicate terrestrially with the first radioterminal over substantially the first frequency band and/or substantially the first air interface, and to communicate terrestrially with the second radioterminal over substantially the second frequency band and/or substantially the second air interface. See the Abstract of U.S. Patent Application Publication No. US 2003/0054762.

SUMMARY

Embodiments according to the invention can provide methods, radioterminals, and ancillary terrestrial components for communicating using spectrum allocated to another satellite operator. Pursuant to these embodiments, a method of providing communications can be provided by at least one space-based and/or terrestrial component of a first system/operator transmitting/receiving information using spectrum allocated to a second system/operator at an aggregate interference level at a space-based component of the second system/operator that is less than or substantially equal to a predetermined threshold.

In some embodiments according to the invention, transmitting/receiving includes selecting a portion of spectrum allocated to the second system/operator to be used for communicating by the first system/operator and transmitting/receiving information by the first system/operator using the portion of spectrum allocated to the second system/operator. In some embodiments according to the invention, the predetermined threshold is less than or substantially equal to 6% $\Delta T/T$. In some embodiments according to the invention, the predetermined threshold is an interference threshold specified by the International Telecommunications Union.

In some embodiments according to the invention, the method further includes adjusting at least one parameter associated with transmitting/receiving information by the first system/operator using the portion of spectrum allocated to the second system/operator to control an interference level at the space-based component of the second system/operator to be less than or substantially equal to the predetermined threshold. In some embodiments according to the invention, adjusting at least one parameter includes limiting a number of users, assigning a data rate for communications and/or assigning a vocoder rate for communications. In some embodiments according to the invention, assigning a data-rate for communications includes assigning paging and/or low data rate communications. In some embodiments according to the invention, the method further includes at least one terrestrial component of the first system/operator transmitting/receiving information using the portion of spectrum allocated to the second system/operator.

In some embodiments according to the invention, transmitting/receiving includes a band of spectrum for communications by the first system/operator including a portion of spectrum allocated to the second system/operator and a portion of spectrum allocated to the first system/operator.

In some embodiments according to the invention, transmitting/receiving includes a data rate that is greater compared to a data rate associated with the paging, the data rate for communications, the vocoder rate for communications and/or the low data rate communications.

In some embodiments according to the invention, transmitting/receiving includes configuring a plurality of first radioterminals to communicate with the at least one space-based and/or terrestrial component of the first system/operator using spectrum allocated to the second system/operator to provide an aggregate in-band interference level and/or configuring a plurality of second radioterminals to communicate with the at least one space-based and/or terrestrial component using spectrum allocated to the first system/operator to provide an aggregate out-of-band interference level, wherein a combination of the in-band and the out-of-band interference levels is less than or substantially equal to the predetermined threshold.

In some embodiments according to the invention, a method of providing communications includes configuring a space-based component of a first system/operator to transmit and/or receive information using spectrum allocated to a second system/operator. In some embodiments according to the invention, a method of providing communications includes a space-based component of a first system/operator transmitting/receiving information using spectrum allocated to a second system/operator to provide an in-band space-based interference component at a space-based component of the second system/operator and/or at least one terrestrial component of the first system/operator transmitting/receiving information using spectrum allocated to the second system/operator to provide an in-band terrestrial interference component at the space-based component of the second system/operator.

In some embodiments according to the invention, the in-band space-based interference component and the in-band terrestrial interference component at the space-based component of the second system/operator provide an interference level that is less than or substantially equal to 6% ΔT/T.

In some embodiments according to the invention, a space-based component of a first system/operator transmitting/receiving information includes communicating with relatively few users, communicating using relatively low data rate communications and/or communicating using relatively low rate vocoder communications.

In some embodiments according to the invention, a method of providing communications includes a space-based component and/or at least one terrestrial component of a first system/operator transmitting/receiving information using spectrum allocated to a second system/operator to allow a continuous band of spectrum for transmitting/receiving information by the first system/operator.

In some embodiments according to the invention, a radioterminal includes a transmitter/receiver circuit configured to transmit/receive information to/from a space-based component and/or to/from at least one ancillary terrestrial component of a first system/operator using spectrum allocated to a second system/operator.

In some embodiments according to the invention, the radioterminal further includes a baseband processor circuit configured to provide data to/from the transmitter/receiver circuit. In some embodiments according to the invention, an aggregate interference controller is configured to adjust at least one parameter associated with the radioterminal to maintain an aggregate interference to be less than or substantially equal to a predetermined threshold.

In some embodiments according to the invention, the aggregate interference controller is configured to limit a number of radioterminals, assign a data mode and/or a vocoder mode to radioterminals using spectrum allocated to the second system/operator.

In some embodiments according to the invention, the predetermined threshold is less than or substantially equal to 6% ΔT/T at a space-based component of the second satellite operator. In some embodiments according to the invention, the predetermined threshold is a level that is specified by the International Telecommunications Union.

In some embodiments according to the invention, an Ancillary Terrestrial Network (ATN) of a first system/operator includes an aggregate interference controller for controlling space-based and/or terrestrial communications of the first system/operator using spectrum allocated to a second system/operator and to maintain an aggregate interference level at a space-based component of the second system/operator at less than or substantially equal to a predetermined threshold.

In some embodiments according to the invention, the aggregate interference controller is further configured to select at least one portion of spectrum allocated to the second system/operator to be used by the first system/operator and configuring radioterminals of the first system/operator to transmit/receive information using the at least one portion of spectrum allocated to the second system/operator.

In some embodiments according to the invention, the predetermined threshold is less than or substantially equal to 6% ΔT/T at a space-based component of the second system/operator. In some embodiments according to the invention, the predetermined threshold is an interference threshold specified by the International Telecommunications Union. In some embodiments according to the invention, the aggregate interference controller is further configured to adjust at least one parameter associated with at least one radioterminal to maintain the aggregate interference at the space-based component of the second system/operator less than or substantially equal to the predetermined threshold.

In some embodiments according to the invention, adjusting at least one parameter comprises limiting a number of radioterminals, assigning a data mode and/or assigning a vocoder mode. In some embodiments according to the invention, the ATN further includes a controller that configures a plurality of first radioterminals to communicate with the space-based component and/or with the ATN of the first system/operator using spectrum allocated to the second system/operator to provide an aggregate in-band interference component and/or configures a plurality of second radioterminals to communicate with the space-based component and/or the ATN using spectrum allocated to the first system/operator to provide an aggregate out-of-band interference component, wherein a combination of the aggregate in-band interference component and the aggregate out-of-band interference component at the space-based component of the second system/operator is less than or substantially equal to the predetermined threshold.

In some embodiments according to the invention, a terrestrial system is configured to transmit and/or receive information wirelessly using at least some spectrum allocated to another system and to maintain a level of interference at the other system at less than or substantially equal to a predetermined threshold.

In some embodiments according to the invention, a method of reusing spectrum of a second system/operator by a first system/operator includes reusing the spectrum of the second system/operator for space-based and/or terrestrial communications by the first system/operator at an aggregate interference level at the second system/operator that is less than or substantially equal to a predetermined threshold.

In some embodiments according to the invention, a space-based component of a system is configured to transmit and/or receive information using at least some spectrum allocated to another system and to maintain a level of interference at the other system that is less than or substantially equal to a predetermined threshold.

In some embodiments according to the invention, a radioterminal is configured to transmit/receive information to/from an element of a first wireless system using spectrum allocated to a second wireless system and to maintain a level of interference at the second wireless system that is less than or substantially equal to a predetermined threshold.

In some embodiments according to the invention, a first wireless system is configured to transmit/receive information using spectrum allocated to a second wireless system and to maintain a level of interference at the second wireless system that is less than or substantially equal to a predetermined threshold. In some embodiments according to the invention, a method of providing communications includes at least one component of a first system/operator transmitting/receiving information using spectrum allocated to a second system/operator and maintaining a level of interference at a component of the second system/operator that is less than or substantially equal to a predetermined threshold.

DESCRIPTION OF EMBODIMENTS
ACCORDING TO THE INVENTION

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first space-based component below could be termed a second space-based component, and similarly, a second space-based component may be termed a first space-based component without departing from the teachings of the present invention. As used herein, the term "and/or" includes any and all combinations of one or more of the associated listed items. The symbol "/" is also used as a shorthand notation for "and/or".

Moreover, as used herein, "substantially the same" band(s) means that two or more bands being addressed/compared substantially overlap, but that there may be some areas of non-overlap, for example at a band end and/or elsewhere. "Substantially the same" air interface(s) means that two or more air interfaces being addressed/compared are similar but need not be identical. Some differences may exist in one air interface (i.e., a satellite air interface) relative to another (i.e., a terrestrial air interface) to account for one or more different characteristics/concerns that may exist between, for example, the terrestrial and satellite communications environments. For example, a different vocoder rate may be used for satellite communications compared to the vocoder rate that may be used for terrestrial communications (i.e., for terrestrial communications, voice may be compressed ("vocoded") to approximately 9 to 13 kbps, whereas for satellite communications a vocoder rate of approximately 2 to 4 kbps, for example, may be used); a different forward error correction coding, different interleaving depth, and/or different spread-spectrum codes may also be used, for example, for satellite communications compared to the coding, interleaving depth, and/or spread spectrum codes (i.e., Walsh codes, long codes, and/or frequency hopping codes) that may be used for terrestrial communications.

Some embodiments of the present invention may arise from a recognition that spectrum used and/or authorized for use by another system/operator may be reused by a given system/operator, provided that an intersystem interference impact does not exceed a threshold level, such as, for example, a threshold noise temperature increase. Accordingly, spectrum of another system/operator that, for example, is interleaved with spectrum of a given system/operator may be reused terrestrially and/or for space-based communications by the given system/operator, provided that interference is controlled. Relatively low power spectral density communications may be provided by the given system/operator in the spectrum of the other system/operator. Systems, methods, terminals, satellites and/or satellite gateways may be provided according to various embodiments of the invention.

The International Telecommunications Union (ITU) has established an interference level of 6% noise temperature increase ("ΔT/T") as a trigger to coordination between two or more Mobile Satellite Systems (MSS). That is, in accordance with the ITU rules, two MSS may interfere without requiring coordination therebetween, provided that the mutual inter-system interference from one system to the other does not exceed 6% ΔT/T. A satellite operator may, therefore, use spectrum allocated to another satellite operator to communicate with space and/or terrestrial components without coordination so long as the interference generated by such communications does not exceed the threshold specified by the ITU.

Figure 1:
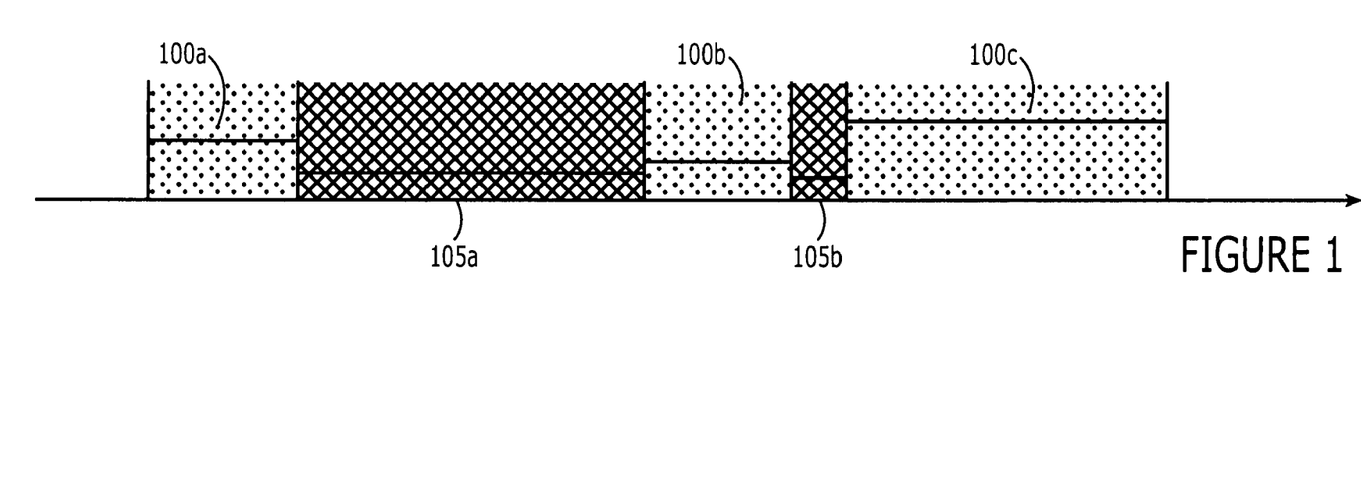
FIG. 1 is a schematic illustration of spectrum allocated to first and second satellite operators.

FIG. 1 is an illustration of first and second portions 100, 105 of spectrum that are allocated to and/or used by first and second satellite operators for communications. Even though the first and second portions 100, 105 of spectrum are illustrated in FIG. 1 to be substantially contiguous, this need not be the case. The portions 100a, 100b, and 100c of spectrum are allocated to and/or used by the first satellite operator and the portions 105a and 105b of spectrum are allocated to and/or used by the second satellite operator. According to some embodiments of the invention, the first satellite operator may provide a first family of radioterminals that radiate a low power spectral density and may allow at least one radioterminal of the first family of radioterminals to communicate with a Space-Based Component (SBC) of the first satellite operator using the low power spectral density and at least one frequency within portions 105a and 105b that is allocated to and/or used by the second satellite operator.

The low power spectral density communications are illustrated by the horizontal lines in the portions 105a and 105b of the spectrum in FIG. 1. These horizontal lines, illustrating a level of interference, may be different for different frequency segments. Accordingly, the horizontal line associated with frequency segment 105a may, in accordance with some embodiments of the invention, be at a level that is different to a level associated with the horizontal line of frequency segment 105b. The SBC of the first satellite operator may comprise at least one satellite, which, in accordance with some embodiments of the invention, may be at least one substantially geo-stationary satellite.

The first satellite operator may also provide a second family of radioterminals that may radiate a higher power spectral density (compared to the first family of radioterminals) and the first satellite operator may configure the second family of radioterminals to communicate with the SBC using frequencies within portions 100a-c allocated to and/or used by the first satellite operator. The high power spectral density communications are illustrated by the horizontal lines in the portions 100a-c of spectrum in FIG. 1.

In other embodiments according to the invention, a radioterminal of the first satellite operator may be configured to operate in a first mode, wherein the radioterminal communicates with an SBC of the first satellite operator using the low power spectral density and at least one frequency within portions 105a-b that is allocated to and/or used by the second satellite operator, and a second mode in which the radioterminal may radiate a higher power spectral density (compared to the first mode) when communicating with the SBC using frequencies within portions 100a-c allocated to and/or used by the first satellite operator.

The at least one radioterminal of the first family of radioterminals (or the radioterminals operating in the first mode), operating using the at least one frequency within the portions 105a-b allocated to and/or used by the second satellite operator, may, in some embodiments according to the invention, be configured to impact an SBC receiver of the second satellite operator by no more than about (6-X) % ΔT/T. As such, the first satellite operator may allow an Ancillary Terrestrial Network (ATN) comprising at least one Ancillary Terrestrial Component (ATC) to communicate with ATN radioterminals over the at least one frequency within the portions 105a-b that is allocated to and/or used by the second satellite operator to the extent that the ATN and/or the radioterminals thereof do not interfere with the satellite receiver of the SBC of the second operator by more than, or substantially more than, X % ΔT/T. The aggregate (or total) SBC and ATN communications of the first satellite operator, by the first satellite operator, can thereby be controlled to interfere with the satellite receiver of the SBC of the second satellite operator by no more than, or substantially more than, 6% ΔT/T.

In FIG. 1, the horizontal line across each portion of the spectrum allocated to the second satellite operator denotes a power spectral density value at an SBC of the second satellite operator due to SBC and/or ATN communications of the first satellite operator. Therefore, the aggregate radiated power spectral density due to SBC and/or ATN communications of the first satellite operator is, in accordance with some embodiments of the invention, controlled and not allowed to exceed an interference level of more than (or approximately more than) 6% ΔT/T to an SBC of the second satellite operator.

Accordingly, the first satellite operator may use (e.g., communicate using) at least some portions of spectrum of a band of frequencies that are allocated to and/or used by the second satellite operator and are not allocated to the first satellite operator to thereby increase a spectrum contiguity measure of a band of frequencies that may be used by the first satellite operator to provide SBC and/or ATN communications using a band of frequencies. It will be understood that, as used herein, the term "communicate" or "communicating" includes actively/intentionally transmitting and/or receiving using another provider's spectrum. This is to be contrasted with incidental interference (i.e., Out-of-Band Emissions (OOBE)) that may inadvertently occur due to the provider's communications using their own spectrum.

In some embodiments, it may be desirable, or mandated by FCC regulations, that a MSS frequency not be used terrestrially if it is not used for space-based communications. In some embodiments, low data rate communications, for example, 100 bps communications, at low power and/or power spectral density, may be provided/assigned between the SBC and the first family of radioterminals and/or the radioterminals in the first mode. In another example, paging communications may be provided for/assigned to the first family of radioterminals and/or for the first mode. In other embodiments, high, medium and/or low data rate communications may be provided by a first system/operator between a SBC of the first system/operator and a family of radioterminals using frequencies allocated to a second system/operator. Terrestrial communications using frequencies that are allocated to and/or used by the second system/operator may also take place at a high, medium and/or low data rate such that the combined radiated power spectral density of terrestrial and space-based communications of the first system/operator, may be controlled to have an interference level at an element of the second system/operator (such as, for example, a SBC of the second system/operator) that is less than or substantially equal to a predetermined threshold. In some embodiments, the predetermined threshold is determined by the ITU and/or is 6% ΔT/T.

Figure 2:
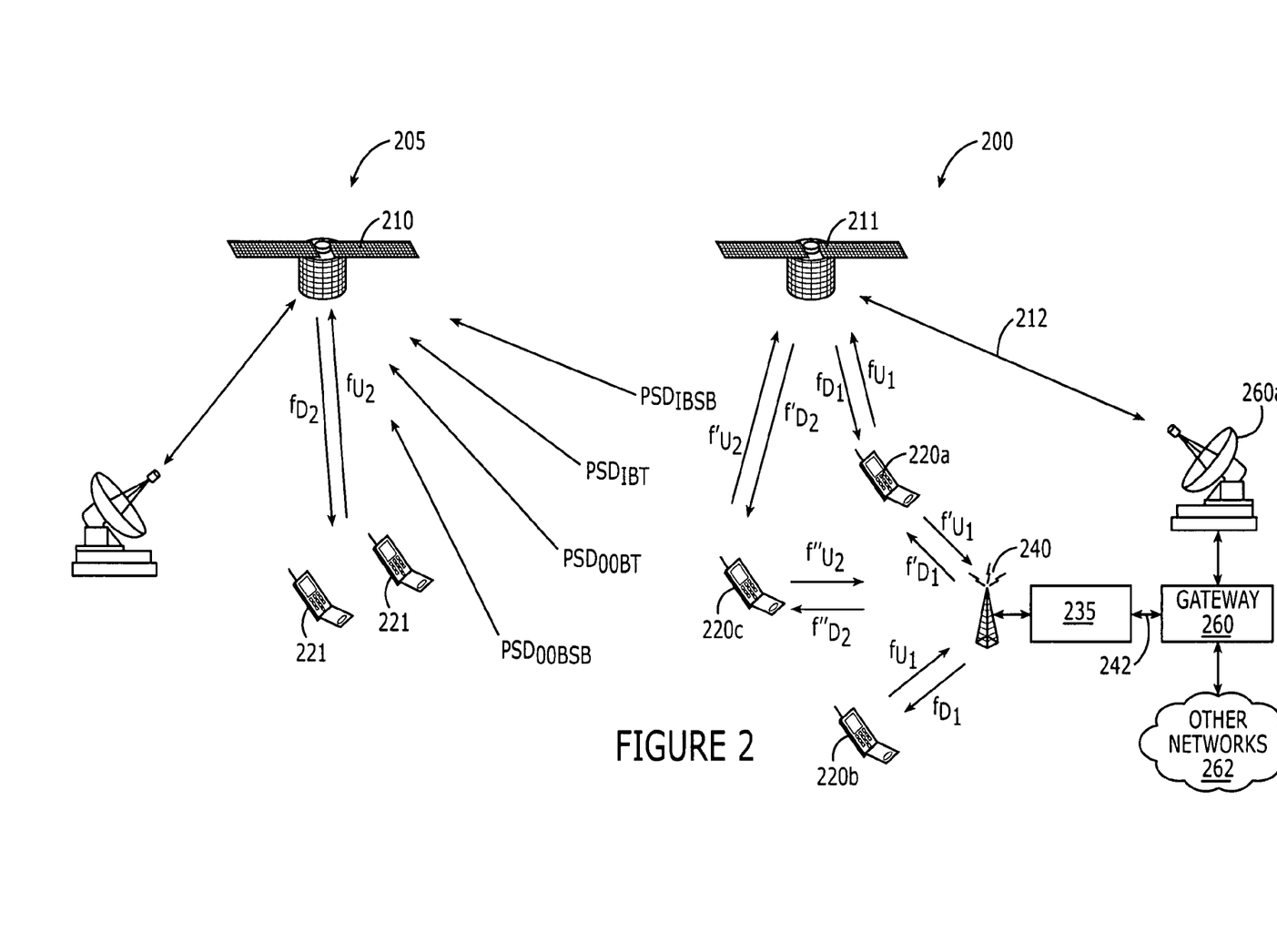
FIG. 2 is a schematic illustration of a cellular satellite radiotelephone system of a first satellite operator that communicates with space based and/or terrestrial components thereof using spectrum allocated to a second satellite operator according to some embodiments of the invention.

FIG. 2 is a schematic illustration of a cellular satellite radiotelephone system of a first satellite operator that communicates with space based and/or terrestrial components thereof using spectrum allocated to a second satellite operator according to some embodiments of the invention. As shown in FIG. 2, a cellular satellite radiotelephone system 200 includes at least one Space-Based Component (SBC) 211, such as a satellite, to communicate with radiotelephones 220a-c served by the first satellite operator. A cellular satellite radiotelephone system 205 includes at least one SBC 210, such as a satellite, to communicate with radiotelephones 221 operated by a second satellite operator.

In some embodiments according to the invention, the cellular satellite radiotelephone systems 200, 205 are operated by different satellite operators. Moreover, the cellular satellite radiotelephone systems 200, 205 are separately licensed for operation in the different frequency spectrums 100a-c and 105a-b respectively as shown in FIG. 1.

Embodiments of satellite radiotelephone system 200 according to the invention can include at least one gateway 260 that can include an antenna 260a and an electronics system that can be connected to other networks 262 including terrestrial and/or other radiotelephone networks that may be configured to provide circuit-switched and/or packet-switched services. The gateway 260 communicates with the SBC 211 over a satellite feeder link 212 and may communicate with an Ancillary Terrestrial Network (ATN) 235 over a wireless and/or wireline communications link 242. The ATN can include at least one Ancillary Terrestrial Component (ATC) 240, which may include an antenna and an electronics system (not shown).

Referring to the cellular satellite radiotelephone system 205, the SBC 210 can communicate with the radiotelephones 221 via one or more respective satellite radiotelephone forward link (downlink) frequencies $f_{D2}$. The SBC 210 also receives communications from the radiotelephones 221 over respective satellite radiotelephone return link (uplink) frequencies $f_{U2}$. The frequencies $f_{D2}$ and $f_{U2}$ are included in the portions 105a-b of the spectrum that is allocated to the second satellite operator as shown in FIG. 1. The cellular satellite radiotelephone system 205 can include other components not shown.

Referring to the cellular satellite radiotelephone system 200, the SBC 211 is configured to transmit wireless communications to a plurality of radiotelephones 220a-c in a satellite footprint. In particular, the SBC 211 is configured to transmit communications to the radiotelephones 220a using a downlink frequency $f_{D1}$. The SBC 211 is also configured to receive wireless communications from the radiotelephones 220a over a satellite uplink frequency $f_{U1}$. The radiotelephones 220a are configured to communicate with the ATC 240 over downlink frequency $f'_{D1}$ and satellite uplink frequency $f'_{U1}$. The frequencies $f_{D1}$, $f_{U1}$, $f'_{D1}$, and $f'_{U1}$, are included in the portions 100a-c of the spectrum that are allocated to the first satellite operator as shown in FIG. 1. It will be understood that the other radiotelephones 220b-c may also communicate (or be selectively configured to communicate) with the SBC 211 using the frequencies $f_{D1}$ and $f_{U1}$ and $f'_{D1}$ and $f'_{U1}$. It will be understood that each of the radiotelephones 220a-c can represent a family of radiotelephones as described herein.

Radiotelephones 220b can communicate with the ATC 240 over the uplink frequency $f_{U1}$ and downlink frequency $f_{D1}$. Thus, as illustrated in FIG. 2, radiotelephone 220a may be communicating with the SBC 211 while radiotelephone 220b may be communicating with the ATC 240. In some embodiments according to the invention, the radiotelephone 220b can also communicate with the SBC 211 using uplink and downlink frequencies allocated to the first satellite operator.

As further shown in FIG. 2, in some embodiments according to the invention, radiotelephones 220c can communicate with the SBC 211 over the downlink/uplink frequencies $f'_{D2}$ and $f'_{U2}$ that are included in the portions 105a-b of the spectrum allocated to the second satellite operator in FIG. 1. The radiotelephones 220c can also communicate with the ATC 240 using the frequencies $f''_{D2}$ and $f''_{U2}$ that are included in the portions 105a-b of the spectrum allocated to the second satellite operator.

It will be understood that in some embodiments according to the invention, the radiotelephones 220c can be configured to communicate with the SBC 211 using the frequencies $f'_{D2}$ and $f'_{U2}$, without communicating with the ATC 240 using the frequencies $f''_{D2}$ and $f''_{U2}$ (or to use frequencies other than $f''_{D2}$ and $f''_{U2}$). In other embodiments according to the invention, the radiotelephones 220c can be configured to communicate with the ATC 240 using the frequencies $f''_{D2}$ and $f''_{U2}$ and configured not to communicate with the SBC 211 using the frequencies $f'_{D2}$ and $f'_{U2}$ (or to use frequencies other than $f'_{D2}$ and $f'_{U2}$.)

The cellular satellite radiotelephone system 200 may also include an aggregate radiated power spectral density controller (i.e., an aggregate interference controller) which may be included in ATN 235, gateway 260, SBC 211 and/or be distributed between ATN 235 gateway 260 and SBC 211 or be a stand-alone system element. The aggregate radiated power spectral density controller may be configured to manage the operations of the ATC 240 and/or the radioterminals 220a-c to control the aggregate radiated Power Spectral Density (PSD) generated by the system 200, which may interfere with the operation of the system 205. In particular, the aggregate radiated power spectral density controller can manage, for example, a number of users and/or electromagnetic emissions thereof operating in the satellite footprint shown in FIG. 2 to maintain an aggregate radiated power spectral density of the system 200 below a specified threshold. Accordingly, the aggregate radiated power spectral density controller may be configured to control the operation of radioterminals 220a-c using uplink and/or downlink frequencies allocated to the first and/or second satellite operator.

As shown in FIG. 2, the radioterminals 220a and 220b using the uplink and downlink frequencies (allocated to the first satellite operator) to communicate with the ATC 240 can generate an out-of-band terrestrial power spectral density interference component ($PSD_{OOBT}$) at the SBC 210. Furthermore, communication between the SBC 211 and the radioterminals 220a using the frequencies allocated to the first satellite operator can also generate an out-of-band space-based PSD interference component ($PSD_{OOBSB}$) at the SBC 210. Accordingly, the aggregate radiated power spectral density controller can manage the operation of the radioterminals 220a-b to maintain the out of band terrestrial and/or space based PSD interference components at the SBC 210 at or below a desired level.

The aggregate radiated power spectral density controller ("the controller") can manage the interference at the SBC 210 generated by the components of the system 200 by, for example, adjusting the number of radioterminals that operate in the footprint shown in FIG. 2. For example, in a CDMA system, the controller may reduce a number of codes available for use by radioterminals over a geographic area. Alternatively or in combination with the above, the controller may adjust a data rate provided by at least some radioterminals over a geographic area, or may configure a number of the radioterminals to operate using a different (e.g., lower) vocoder rate. The adjusted parameter(s) can allow the aggregate PSD reaching SBC 210 to be, for example, reduced so that the aggregate PSD at SBC 210 is maintained at an interference level that is less than, or approximately equal to, for example, 6% ΔT/T. In systems using other types of air-interfaces, the controller may, instead of or in addition to the above, adjust other parameters. For example, in a GSM system, the controller may change a number of time slots that at least some radiotelephones may use to transmit/receive to manage the PSD at the SBC 210.

Techniques used to maintain aggregate radiated power spectral density at levels equal to or less than a threshold are described in greater detail in, for example, U.S. patent application Ser. No. 11/300,868, entitled Aggregate Radiated Power Control for Multi-Band/Multi-Mode Satellite Radiotelephone Communications Systems and Methods, filed Dec. 15, 2005, the entirety of which is incorporated herein by reference.

In addition to managing the out-of-band interference components generated by communications using uplink/downlink frequencies allocated to a first satellite operator, the aggregate radiated power spectral density controller also maintains control over in-band interference components generated by the use of the spectrum allocated to the second satellite operator. In particular, the use of uplink and downlink frequencies allocated to the second satellite operator by the radiotelephones 220c can generate in-band terrestrial and space based PSD interference components ($PSD_{IBT}$ and $PSD_{IBSB}$) at the SBC 210. For example, use of the uplink and/or downlink frequencies, $f'_{U2}$ and $f'_{D2}$, can generate an in-band space based PSD interference component at the SBC 210. Similarly, use of the uplink and/or downlink frequencies $f''_{U2}$ and $f''_{D2}$ can generate an in-band terrestrial PSD interference component at the SBC 210.

Accordingly, the aggregate radiated power spectral density controller also manages the configuration and operation of the radioterminals 220c. Thus, the controller maintains a desired aggregate radiated power spectral density including the interference components generated by the use of the spectrum allocated to the first satellite provider as well as the interference components generated by the use of the spectrum allocated to the second satellite operator. In particular, the aggregate radiated power spectral density controller can combine the interference components generated by the in-band terrestrial and space-based PSD with the out-of-band terrestrial and space-based PSD interference components to provide a desired overall aggregate radiated power spectral density at the SBC 210.

To manage the overall aggregate radiated power spectral density at the SBC 210, the controller may configure a number of the radioterminals 220c to communicate using the spectrum allocated to the first satellite operator. To reduce the in-band terrestrial and space-based PSD interference components, the controller can adjust the parameters used by the radiotelephones 220c to communicate with the SBC 211 and the ATC 240. For example, in some embodiments, the controller can reduce a number of users configured to communicate using the spectrum allocated to the second satellite operator. In other embodiments according to the invention, the controller can configure the radioterminals 220c and/or the SBC 211 for low data rate service, such as paging services associated with the radioterminals 220c. In still other embodiments according to the invention, the controller can configure the radioterminals 220c to use relatively low rate vocoders, such as 4 kbps (vs. 16 kbps).

It will be understood that in any of these approaches according to embodiments of the invention, the aggregate radiated power spectral density controller can affect the in-band terrestrial and space-based PSD interference components so that the PSD at the SBC 210 does not exceed a predetermined threshold for interference.

As described above, using at least a portion of the spectrum allocated to the second satellite operator, along with the spectrum allocated to the first satellite operator, can provide a continuous band of spectrum for communications by the first satellite operator. In some embodiments according to the invention, the controller can configure a number of the radioterminals 220c to operate using a portion of the spectrum allocated to the second satellite provider (i.e., the second system 205) for communications with the ATC 240. The controller can further configure the radioterminals 220c to communicate with the SBC 211 also using a portion of the spectrum allocated to the second satellite operator to provide relatively low data rate communications thereto/from the SBC 211.

This approach may allow a greater number of radioterminals 220c to operate using the spectrum allocated to the second satellite operator as the in-band interference generated by communicating with the ATC 240 may be low compared to interference generated by communicating with the SBC 211 using the spectrum allocated to the second satellite provider. Accordingly, the aggregate radiated power spectral density controller may provide a net benefit (for example in terms of increased number of radioterminals 220c that can be serviced) while still maintaining the aggregate radiated PSD at the SBC 210 at or below a specified threshold for interference. This may be accomplished even though the aggregate radiated power spectral density controller may, in some embodiments according to the invention, configure the radioterminals 220a and 220b to reduce the interference components generated by the out-of-band operation of those radioterminals. Therefore, at least some of the spectrum allocated to the second satellite operator may be used by the first satellite operator, while still maintaining an interference at or below a specified threshold, by preferentially configuring the radioterminals 220c to use at least a portion of the spectrum of the second satellite operator to communicate with the ATC 240 rather than the SBC 211.

Figure 3:
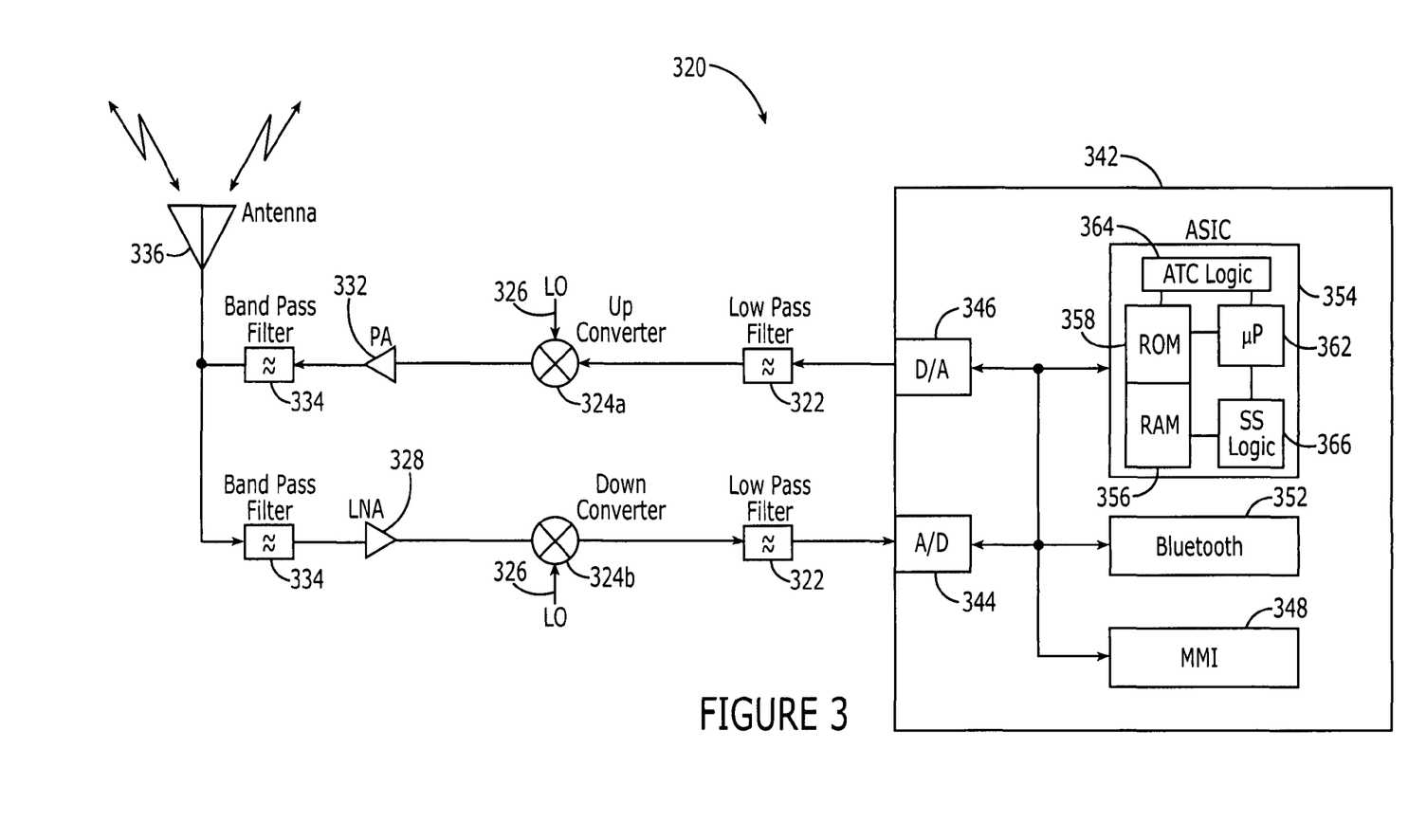
FIG. 3 is a block diagram that illustrates radiotelephones configured to communicate with space based and/or terrestrial components according to some embodiments of the invention.

FIG. 3 is a block diagram of radiotelephones that may be used to communicate with space-based components and/or Ancillary Terrestrial Components using spectrum allocated to another satellite operator at an aggregate radiated power spectral density that is less than a predetermined threshold. In some embodiments according to the invention, a radiotelephone 320 can be used with satellite radiotelephone systems according to some embodiments of the present invention that include an ancillary terrestrial component and a space-based component that use substantially the same band and substantially the same air interface. The ability to use spectrum allocated to another satellite provider can, for example, increase spectrum contiguity and/or a number users that can be supported.

Referring to FIG. 3, a single Radio Frequency (RF) chain including low pass filters 322, up and down converters 324a, 324b, Local Oscillators (LO) 326, Low Noise Amplifier (LNA) 328, Power Amplifier (PA) 332, band-pass filters 334 and antenna 336, may be used. A single baseband processor 342 may be used, including an analog-to-digital converter (A/D) 344, a digital-to-analog converter (D/A) 346 and a Man-Machine Interface (MMI) 348. An optional Bluetooth interface 352 may be provided. An Application-Specific Integrated Circuit (ASIC) 354 may include thereon Random Access Memory (RAM) 356, Read-Only Memory (ROM) 358, a microprocessor (μP) 362, logic for ancillary terrestrial communications (ATC Logic) 364 and logic for space-based communications (Space Segment Logic or SS Logic) 366. The SS Logic 366 can be used to accommodate satellite-unique requirements over and above those of cellular, ATC or PCS, such as a satellite-unique vocoder, a satellite forward error correction coding scheme, a satellite-unique interlever, etc. However, in accordance with some embodiments of the invention, this added gate count may not substantially increase the cost of the ASIC 354.

As described herein, some embodiments of the present invention may arise from a recognition that spectrum belonging to another satellite operator may be reused by a given operator, provided that an intersystem interference level does not exceed a given threshold, such as, for example, a given noise temperature increase (i.e., $\Delta T/T$). Accordingly, spectrum of another operator that, for example, is interleaved with spectrum of a given operator may be reused terrestrially and/or for space-based communications by the given operator, provided that the intersystem interference level is controlled to not exceed the given threshold. Accordingly, low power spectral density communications, relative to an acceptable intersystem interference level of a space segment of the other operator, may thus be provided by the given operator in at least a portion of the spectrum of the other operator.

According to some embodiments of the invention, the given operator may be Mobile Satellite Ventures, LP ("MSV") and the other operator may be Inmarsat, Globalstar, Iridium, XM-Satellite Radio, Sirius Satellite Radio, TerreStar and/or ICO. It will be appreciated by those skilled in the art that although the principles, systems and/or methods described herein have been described in the context of specific illustrative embodiments relating to first and second satellite systems/operators, the principles, systems and/or methods of the present invention may be applied to any first and second systems. For example, in some embodiments according to the invention, the first system/operator may be a satellite system/operator and the second system/operator may be a cellular/PCS system/operator. In other embodiments, the first system/operator may be a cellular/PCS system/operator and the second system/operator may be a cellular/PCS system/operator, etc.

In the specification, there have been disclosed embodiments of the invention and, although specific terms are employed, they are used in a generic and descriptive sense only and not for purposes of limitation, the scope of the invention being set forth in the following claims.

What is claimed:

1. A method of providing wireless communications; the method comprising:
   transmitting/receiving information by a terrestrial component using spectrum that is allocated to a first space-based component of a first system/operator and maintaining an aggregate interference level at the first space-based component of the first system/operator at less than or substantially equal to a first predetermined threshold; and
   transmitting/receiving information by the terrestrial component using spectrum that is allocated to a second space-based component of a second system/operator and maintaining an aggregate interference level at the second space-based component of the second system/operator at less than or substantially equal to a second predetermined threshold.

2. A method according to claim 1 further comprising:
   intentionally transmitting/receiving information by the terrestrial component using the spectrum that is allocated to the first space-based component of the first system/operator and the spectrum that is allocated to the second space-based component of the second system/operator.

3. A method according to claim 2 further comprising:
   adjusting at least one parameter associated with the intentionally transmitting/receiving information by the terrestrial component to control an interference level at a space-based component.

4. A method according to claim 3 wherein adjusting at least one parameter comprises limiting a number of users, assigning a data rate for communications and/or assigning a vocoder rate for communications.

5. A method according to claim 4 wherein assigning a data-rate for communications comprises assigning paging and/or low data rate communications.

6. A method according to claim 1 wherein the first and/or second predetermined threshold is less than or substantially equal to 6% $\Delta T/T$.

7. A method according to claim 1 wherein the first and/or second predetermined threshold is an interference threshold specified by the International Telecommunications Union.

8. A method according to claim 1 further comprising:
   transmitting/receiving information by the first space-based component of the first system/operator using spectrum that is allocated to the second space-based component of the second system/operator.

9. A method according to claim 1 wherein the first and second predetermined thresholds differ therebetween.

10. A radioterminal comprising:
    a transmitter/receiver circuit configured to transmit/receive information to/from a terrestrial component using spectrum that is allocated to a first space-based component of a first system/operator and using spectrum that is allocated to a second space-based component of a second system/operator; and
    a baseband processor circuit configured to provide data to/from the transmitter/receiver circuit,
    wherein an aggregate interference controller is configured to adjust at least one parameter associated with the radioterminal to maintain an aggregate interference to be less than or substantially equal to a predetermined threshold, and
    wherein the predetermined threshold is less than or substantially equal to 6% $\Delta T/T$ at the second space-based component of the second satellite operator.

11. A radioterminal according to claim 10 wherein the aggregate interference controller is configured to limit a number of radioterminals, to assign a data mode to a number of radioterminals and/or to assign a vocoder mode to a number of radioterminals.

* * * * *